C. A. BARTLETT AND D. W. SCHOENTHAL.
CASTER.
APPLICATION FILED APR. 11, 1922.

1,435,371.

Patented Nov. 14, 1922.

Inventors.
Charles A. Bartlett.
Daniel W. Schoenthal.

By Lacey & Lacey, Attorneys

Patented Nov. 14, 1922.

1,435,371

UNITED STATES PATENT OFFICE.

CHARLES A. BARTLETT AND DANIEL W. SCHOENTHAL, OF McMINNVILLE, OREGON.

CASTER.

Application filed April 11, 1922. Serial No. 551,468.

*To all whom it may concern:*

Be it known that we, CHARLES A. BARTLETT and DANIEL W. SCHOENTHAL, citizens of the United States, residing at McMinnville, in the county of Yamhill and State of Oregon, have invented certain new and useful Improvements in Casters, of which the following is a specification.

Our invention relates to casters and is intended more particularly for use upon pianos or other heavy articles to permit the same to be easily moved and avoid the formation of dents in or otherwise marring the surfaces of finely finished floors. The invention is illustrated in the accompanying drawings and consists in a novel construction, combination and arrangement of parts which will be hereinafter fully pointed out.

In the drawings—

Figure 1:
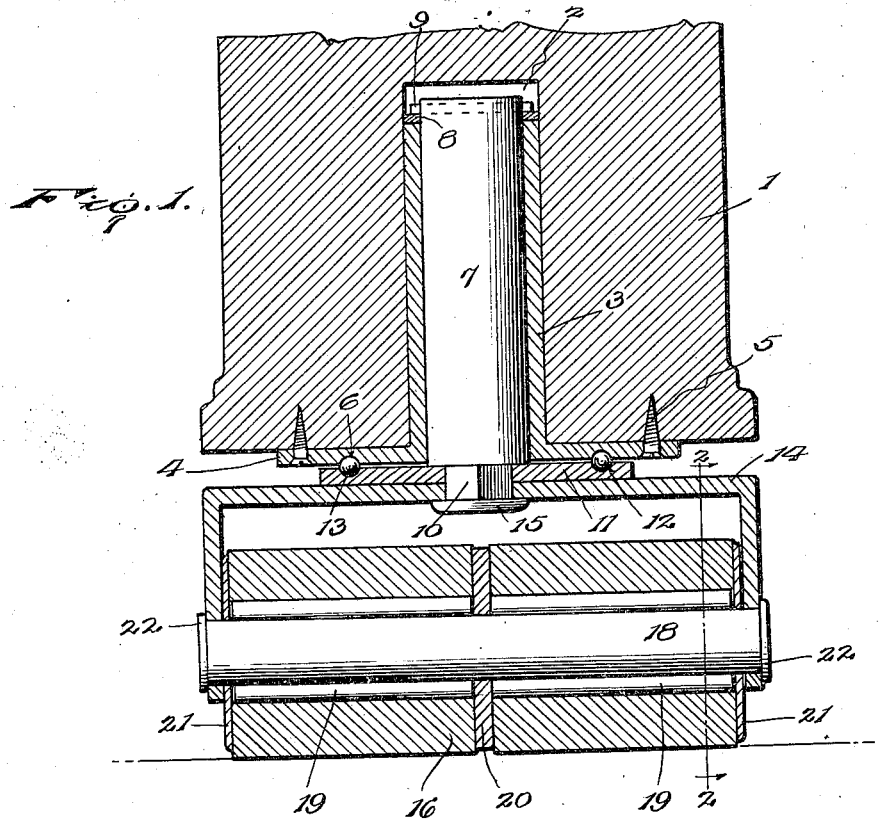
Figure 1 is a vertical section taken longitudinally of the caster or roller showing the same applied to a piano leg.
Figure 2:
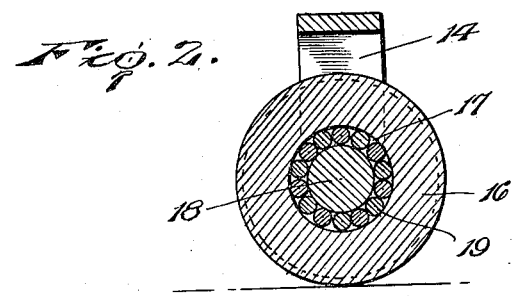
Fig. 2 is a detail transverse section on the line 2—2 of Fig. 1.

In the drawings, the reference numeral 1 indicates a portion of the leg or frame of a piano or other heavy article of furniture having a central vertical recess or chamber 2 formed therein. Within the said recess or chamber 2, we fit snugly a sleeve 3 having a disk or base plate 4 formed at its lower end fastening screws or similar devices 5 being inserted through the said plate or disk into the leg 1 so as to secure the disk and the sleeve in fixed position. The disk or plate is provided with an annular groove 6 in its under surface concentric with the sleeve 3 and the said sleeve 3 terminates somewhat below the upper end of the recess or chamber 2. Fitted within the sleeve 3 closely but capable of free rotation is a stem or spindle 7 equipped at its upper end with a washer 8 adapted to rest upon the upper end of the sleeve 3 and retained in place by a pin or other retainer 9 carried by the upper extremity of the spindle. The spindle 7 is provided at its lower end with a reduced neck 10 of angular formation and upon the said neck is fitted a disk or bearing plate 11 having an annular groove 12 in its upper surface. The said groove 12 mates with the groove 6 in the wear plate 4, and friction balls 13 are fitted in the said mating grooves so as to permit free rotary movement of the bearing plate 11, as will be readily understood. Upon the reduced angular neck 10 of the spindle 7, below the bearing plate 11, is fitted a yoke or bail 14 and at the extremity of the neck 10 is provided a head or retaining collar 15 which projects beyond the edge of the opening in the yoke so as to bear against the under surface of the connecting portion of the yoke and thereby retain it in position upon the neck. Between the downturned ends of the yoke 14 is arranged a roller or drum 16 having a longitudinal bore 17 through which is inserted an axle or sustaining pin 18. The diameter of the axle 18 is less than the diameter of the bore 17 and friction rollers 19 are inserted between the axle and the wall of the bore, as shown and as will be readily understood. A spacing ring 20 is fitted about the axle 18 at the center thereof so as to separate the two series of rollers 19 and permit them to rotate in opposite directions when the caster is called upon to make a short turn or pivotal movement in a horizontal plane. The rollers 19 are retained within the drum or caster 16 by cap plates 21 secured upon the ends of the drum and the ends of the axle may be upset, as indicated at 22, or provided with other retaining means whereby release of the axle from the yoke will be prevented.

From the foregoing description, taken in connection with the accompanying drawings, it will be seen that we have provided a very simple and inexpensive device which will permit very ready movement of heavy articles and which will provide a wide bearing surface in contact with the floor or other surface over which the article is moved so that the formation of grooves or other marring effects upon highly finished floors will be avoided. The weight of the article to which the caster is applied is carried by the balls 13 and the main drum 16 and the said balls 13 permit free rotation of the drum 16 about the axis of the spindle 7 as a center so that the article may be very easily diverted from a straight path. The arrangement and form of the bearing plate 11 and the length of the main caster or drum 16 overcome the tendency of the parts to tilt in vertical planes so that the person moving the furniture is not required to sustain the weight of the same at any time. Our device may be readily applied to pianos or other articles now in use without any substantial reconstruction of the caster or of the article to which it is to be applied.

Having thus described the invention, what is claimed as new is:

The combination with an article to be supported and having a vertical chamber open through its lower end, of a sleeve fitted snugly within said chamber and provided at its lower end with a wear plate secured against the lower end of the article, said wear plate being provided with an annular groove in its under side, a spindle fitted closely within said sleeve and provided at its lower end with a reduced angular neck, means at the upper end of said spindle for retaining it in the sleeve, a bearing plate fitted upon the reduced neck of the spindle and provided in its upper side with an annular groove mating with the annular groove in the wear plate, anti-friction devices fitted in said mating grooves, a yoke fitted upon the angular neck of the spindle, means for retaining said yoke and the bearing plate upon said neck, an axle secured in the extremities of said yoke, a drum mounted upon said axle, anti-friction rollers fitted within said drum about the axle, a spacing ring disposed between the inner opposed ends of the rollers, and means at the ends of the drum for retaining the rollers therein.

In testimony whereof we affix our signatures.

CHARLES A. BARTLETT. [L. S.]
DANIEL W. SCHOENTHAL. [L. S.]